(12) United States Patent
Liang et al.

(10) Patent No.: US 8,899,839 B2
(45) Date of Patent: Dec. 2, 2014

(54) GEOMETRIC CONCEPT FOR A ROLLER-FLANGE CONTACT IN ROLLER BEARINGS

(75) Inventors: Baozhu Liang, Dittlebrunn-Hambach (DE); Michael Reugels, Hassfurt (DE)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 13/991,221

(22) PCT Filed: Nov. 28, 2011

(86) PCT No.: PCT/EP2011/071157
§ 371 (c)(1),
(2), (4) Date: Aug. 15, 2013

(87) PCT Pub. No.: WO2012/076353
PCT Pub. Date: Jun. 14, 2012

(65) Prior Publication Data
US 2013/0322805 A1    Dec. 5, 2013

(30) Foreign Application Priority Data
Dec. 6, 2010  (DE) .......................... 10 2010 062 481

(51) Int. Cl.
*F16C 33/34* (2006.01)
*F16C 33/58* (2006.01)
*F16C 33/64* (2006.01)
*F16C 19/22* (2006.01)
*F16C 19/36* (2006.01)

(52) U.S. Cl.
CPC .............. *F16C 33/64* (2013.01); *F16C 33/585* (2013.01); *F16C 19/225* (2013.01); *F16C 2240/40* (2013.01); *F16C 19/364* (2013.01)
USPC ........................................ 384/564; 384/571

(58) Field of Classification Search
CPC .... F16C 19/225; F16C 19/364; F16C 19/383; F16C 33/36; F16C 33/366; F16C 33/583; F16C 33/585; F16C 33/586; F16C 33/64; F16C 2240/30; F16C 2240/40; F16C 2240/50
USPC .......................................... 384/564, 565, 571
See application file for complete search history.

(56) References Cited

U.S. PATENT DOCUMENTS

| | | | |
|---|---|---|---|
| 6,530,693 B1 | 3/2003 | Ijuin | |
| 8,033,737 B2 * | 10/2011 | De Mul | .......................... 384/564 |
| 2007/0041678 A1 | 2/2007 | Matsuyama | |

FOREIGN PATENT DOCUMENTS

| | | |
|---|---|---|
| CH | 212693 A | 12/1940 |
| DE | 10203113 A1 | 8/2002 |

(Continued)

*Primary Examiner* — Phillip A Johnson
(74) *Attorney, Agent, or Firm* — Bryan Peckjian; SKF USA Inc. Patent Department

(57) ABSTRACT

A bearing ring for a roller bearing includes a raceway for at least one roller that includes an at least partially spherically formed roller end surface having a first curvature. A flange for transferring axial forces extends from an end of the raceway and has a flange surface that faces towards the roller end surface. A spherical flange surface section having a second curvature is defined on the flange surface. The first curvature differs from the second curvature such that a first gap ($d_1$) exists between the spherically formed roller end surface and the spherical flange surface section. The flange surface also includes an opening flange surface section having a third curvature, which is less than the second curvature, such that a second gap ($d_2$) exists between the roller end side and the opening flange surface section. The second gap is larger than the first gap.

20 Claims, 6 Drawing Sheets

(56) References Cited

FOREIGN PATENT DOCUMENTS

| DE | 102005061102 A1 | 7/2007 |
| DE | 102008020068 A1 | 10/2009 |
| EP | 1482191 A2 | 12/2004 |
| EP | 1754899 A2 | 2/2007 |
| JP | 4331813 A | 5/2000 |
| JP | 2005003121 A | 1/2005 |
| JP | 2006349014 A | 12/2006 |

* cited by examiner

GEOMETRIC CONCEPT FOR A ROLLER-FLANGE CONTACT IN ROLLER BEARINGS

CROSS-REFERENCE

This application is the U.S. national stage of International Application No. PCT/EP2011/071157 filed on Nov. 28, 2011, which claims priority to German patent application no. 10 2010 062 481.0 filed on Dec. 6, 2010.

TECHNICAL FIELD

The present invention relates to a geometric concept for a roller-flange contact in roller bearings, in particular for a tapered-roller-flange-contact in tapered roller bearings.

RELATED ART

Guide flanges in roller bearings, such as e.g. tapered roller bearings, can be embodied either straight or spherical. Straight flanges are mainly used for roller bearings of small diameter and thus also of smaller flange widths. In this case, a flange width is often too small to produce a defined profile on an available flange surface. Spherical flanges find application mostly in roller bearings having larger diameters and thus also having larger flange widths. A spherical flange is characterized in that a radius, which describes a flange shape facing towards a roller raceway, has its origin substantially on an axis of rotation of the rollers (roller rotational axis), wherein small deviations are allowed due to alignment errors.

For a more detailed description of roller bearings having spherical flanges, FIG. 1 shows, in a schematic representation, a longitudinal section of a roller bearing 10, which is exemplarily formed as a tapered roller bearing. The roller bearing 10 includes a bearing inner ring 11, a bearing outer ring 12, and a plurality of rollers 13, which can roll on races or raceways 14, 15 formed by the inner sides of the bearing rings 11, 12. In the case of tapered roller bearings, tapered rollers are the rollers corresponding to the rollers or rolling elements 13.

The tapered rollers 13 can roll on an inner raceway 14, which is formed in the bearing inner ring 11, and on an outer raceway 15, which is formed in the bearing outer ring 12. Considering a tapered roller bearing in three-dimensions, the raceways 14, 15 are formed as conical outer surfaces. In the longitudinal section shown in FIG. 1 of the tapered roller bearing 10, the raceways 14, 15 define, in an imaginary extension, an inner line 16 and an outer line 17, which meet on an axis of rotation 18 of the roller bearing 10 at a rotation point 19.

During an operation of the bearing 10, each (tapered) roller 13 rotates around its own roller axis 20, wherein an imaginary extension of the roller axis 20 also intersects with the pivot point 19. A rolling condition on the raceways 14, 15 for the tapered rollers 13 is realized by a relative position of inner line 16, outer line 17, bearing axis of rotation 18, and roller axis 20, which all intersect in the pivot point 19, so that with a relative rotation of bearing inner ring 11 and bearing outer ring 12, the tapered rollers 13 roll on the raceways 14, 15 substantially without slippage, and an amount of friction related thereto is minimized.

When supporting axial forces, in order to also optimize the friction that occurs in the axial direction i.e. in the direction of the bearing rotational axis 18, the rollers 13 used in roller bearings can have a first curvature, on their end side 21, identified by a first radius $R_{21}$, so that a part of a ball surface results as an end side surface of the rollers 13, which, as is indicated in the enlargement of FIG. 1, is in contact at a contact point 22 with a straight- or spherically-embodied flange 23, for example of the bearing inner ring 11. In order to achieve a defined contact point 22, the spherically curved flange surface has a second curvature defined by a second radius $R_{23}$, which curvature is less than the first curvature of the spherical end side surface 21 of the rollers 13.

In roller bearings, such as for example cylindrical roller, barrel roller, or ball bearings, which are designed with straight or flat flanges, in comparison to spherically embodied flanges the roller-flange contact has a higher surface pressure (Hertzian pressure) between the roller end side 21 and the flange surface facing towards this. Here the Hertzian pressure is understood to be the greatest pressure that prevails in the middle of the contact surface of two elastic bodies. If, such as with roller bearings with straight flanges, two elastic bodies (curved roller end side and straight or flat flange) are pressed against each other, then in the ideal case they touch only in a punctiform manner. However, in the real case, a flattening and thus a contact surface arises at the contact point 22 due to the elasticity. A characteristic pressure distribution (surface pressure) arises on the contact surface in both bodies, wherein the pressure is always highest in the middle. If, as here, a ball outer surface and a flat flange surface touch, a touch- or contact-ellipse results. Due to the comparatively high surface pressure, with roller bearings having straight flanges, a relatively poor lubricant film formation generally results at higher effective forces. In addition, in comparison to spherical flanges, straight or flat flanges lead to smaller contact ellipses between the roller end side and the flange surface facing this, for which reason an overlapping of the contact ellipse with the flange edges can result only with extreme loads. Likewise, with straight- or flat-embodied flanges, there is a low sensitivity of the contact point 22 to alignment errors, so that a defined contact point 22 between roller 13 and flange is possible. While on the one hand a greater skewing of the roller 13 is made possible with flat-embodied flanges, on the other hand a relatively poor guiding of the rollers results during operation.

Tapered roller bearings in the large bearing field can, as shown with reference to FIG. 1, be embodied with spherical flanges 23, which compared to straight or flat flanges has a lower surface pressure between the roller end side 21 and the flange surface facing towards the roller 13 as a consequence. In addition, spherically-designed flanges 23 lead, compared to straight flanges, to larger contact ellipses between the roller end side 21 and the opposing flange surface, so that overlappings of the contact ellipse with the flange edges and thus edge stresses can frequently result. In general, with spherically-designed flanges 23 there is a higher sensitivity of the contact point 22 to alignment errors than is the case with flat- or straight-embodied flanges. Although on the one hand spherical flanges have a lower skewing of the roller 13 as a consequence, on the other hand due to the narrow osculation between the roller end side 21 and the flange surface facing towards roller 13, the roller 13 can be guided better during operation. A defined contact point 22 between the roller 13 and the flange 23 is also theoretically possible with spherical flanges by a different choice of the radii of curvature (and/or their origins) of roller end surface 21 and spherical flange surface.

However, one of the main disadvantages of a spherical flange is the resulting sensitivity of the contact point 22 between the roller end side 21 and the flange 23 to alignment error. Deviations in the raceway angle, roller angle, flange radius, as well as roller end side radius have a decisive influence thereon.

SUMMARY

Therefore, in one aspect of the present teachings, techniques are disclosed to reduce this sensitivity of the contact point between the roller end side and the flange to alignment error.

In order to reduce the sensitivity of the roller-flange contact point to alignment error, but nevertheless to be able to ensure a sufficient guiding of the roller during operation, an appropriately optimized flange surface geometry is proposed herein. For this the proposed flange surface geometry has on the one hand a spherical section which should ensure the roller guiding as well as a low Hertzian pressure. On the other hand, the proposed flange geometry also has what is referred to below as an opening section, which produces a larger gap dimension, i.e. a larger spacing, between the roller end surface and the flange surface facing towards this, than would be provided with a purely spherically formed flange.

For this, exemplary embodiments of the present invention provide a bearing ring for a roller bearing having a raceway for at least one roller, which has an at least partially spherically formed roller end surface having a first curvature. For transferring axial forces, the bearing ring has a flange disposed on an end-side of the roller, which flange has a flange surface facing towards the roller end side, wherein the flange surface comprises a spherical flange surface section having a second curvature, which can be designed as constant or variable on the spherical flange surface section. The first and the second curvature are chosen so as to achieve a first gap dimension (which depending on the roller-flange geometry can also be a mean gap dimension) between the spherically-designed roller end surface and the spherical flange surface section. In addition, the flange surface has an opening flange surface section having a lesser-than-the-second curvature for a larger-than-the-first gap dimension between the roller end surface and the opening flange surface section.

According to a further aspect, a method is also provided for manufacturing a bearing ring for a roller bearing having a roller raceway for at least one roller, wherein the roller has a spherically-designed roller end surface having a first curvature. The method comprises a step for providing a flange disposed on an end-side of the roller for transferring axial forces, which flange has a flange surface facing towards the roller end surface, wherein the provision step in turn includes the following steps:

Provision of a spherical surface section of the flange surface with a second curvature, wherein the second curvature is chosen with respect to the first curvature such that a first gap dimension is achieved between the spherically embodied roller end surface and the spherical flange surface section; and Production of an opening surface section of the flange surface with a lesser-than-the-second curvature, so that a larger-than-the-first gap dimension results between the spherically embodied roller end surface and the opening surface section.

According to exemplary embodiments, the second curvature of the spherical flange surface section can be designed as constant or variable.

According to exemplary embodiments, a first tangential plane to a hypothetical purely spherically extending flange surface, instead of the opening surface section in this region, and a second tangential plane to the opening flange surface section enclose a maximum angle $\alpha$, which is larger than 0° and smaller than or equal to 30°.

According to exemplary embodiments, the spherical flange surface section extends over an area of at least one third of the flange surface.

According to some exemplary embodiments, the spherical flange surface section extends from a corner region between the raceway and the flange surface to a radial end of the flange or a flange edge. In a bearing inner ring, the spherical flange surface section can thus lie in a lower region of the flange, which lower region faces towards an inner race and adjacent to a flange or groove edge, wherein the opening flange section in this case, bordering the spherical flange surface section, lies in the upper region of the flange. In a bearing outer ring it is correspondingly reversed, i.e. the spherical flange section here lies in an upper region of the flange bordering a flange or groove edge, wherein the opening flange section is then located in the lower region of the flange, which lower region faces way from the outer race.

However, according to other exemplary embodiments it is also possible that the spherically-designed section does not border the flange edge between raceway and flange, so that opening flange surface regions are located above and below the spherical section. In this case, a first opening flange surface section extends from a corner region between the raceway and the flange surface, wherein the spherical flange surface section connects to the first opening flange surface section in the radial direction. On a region of the spherical flange surface section facing away from the first opening flange surface section, a second opening surface section extends in the radial direction from the spherical flange surface section to a radial end of the flange.

According to exemplary embodiments the roller bearing is a tapered roller bearing. The roller is then accordingly formed as a tapered roller.

Due to the proposed roller-flange contact geometry in the form of a spherical flange surface section in combination with a directly-bordering opening flange surface section, the roller guiding during operation can be preserved due to the spherically formed flange section. The spherical flange surface section additionally provides for a low Hertzian pressure.

The opening flange section can reduce a size of the contact ellipse in comparison to purely spherical flanges, whereby an overlapping of the contact ellipse with the flange edges can be avoided. Due to the opening flange regions, there is also a lower sensitivity of the location of the contact point between roller end side and flange to alignment errors, so that a defined contact point between roller and flange is made possible.

The proposed roller-flange geometry is designed such that in the ideal geometry the contact point or region between roller end side and flange lies in the spherical flange region.

The sensitivity of the contact point to alignment errors is comparable in the spherical flange region to the sensitivity of a purely spherical flange. However, the contact point shifts due to deviations in shape in the opening flange region; thus the sensitivity is greatly reduced, which can prevent a "wandering" of the theoretical contact point out over the flange edges and thus also can prevent the above-mentioned high edge stresses.

BRIEF DESCRIPTION OF THE DRAWINGS

Exemplary embodiments of the present invention are explained in more detail below with reference to the accompanying figures.

DETAILED DESCRIPTION OF THE INVENTION

Figure 1:
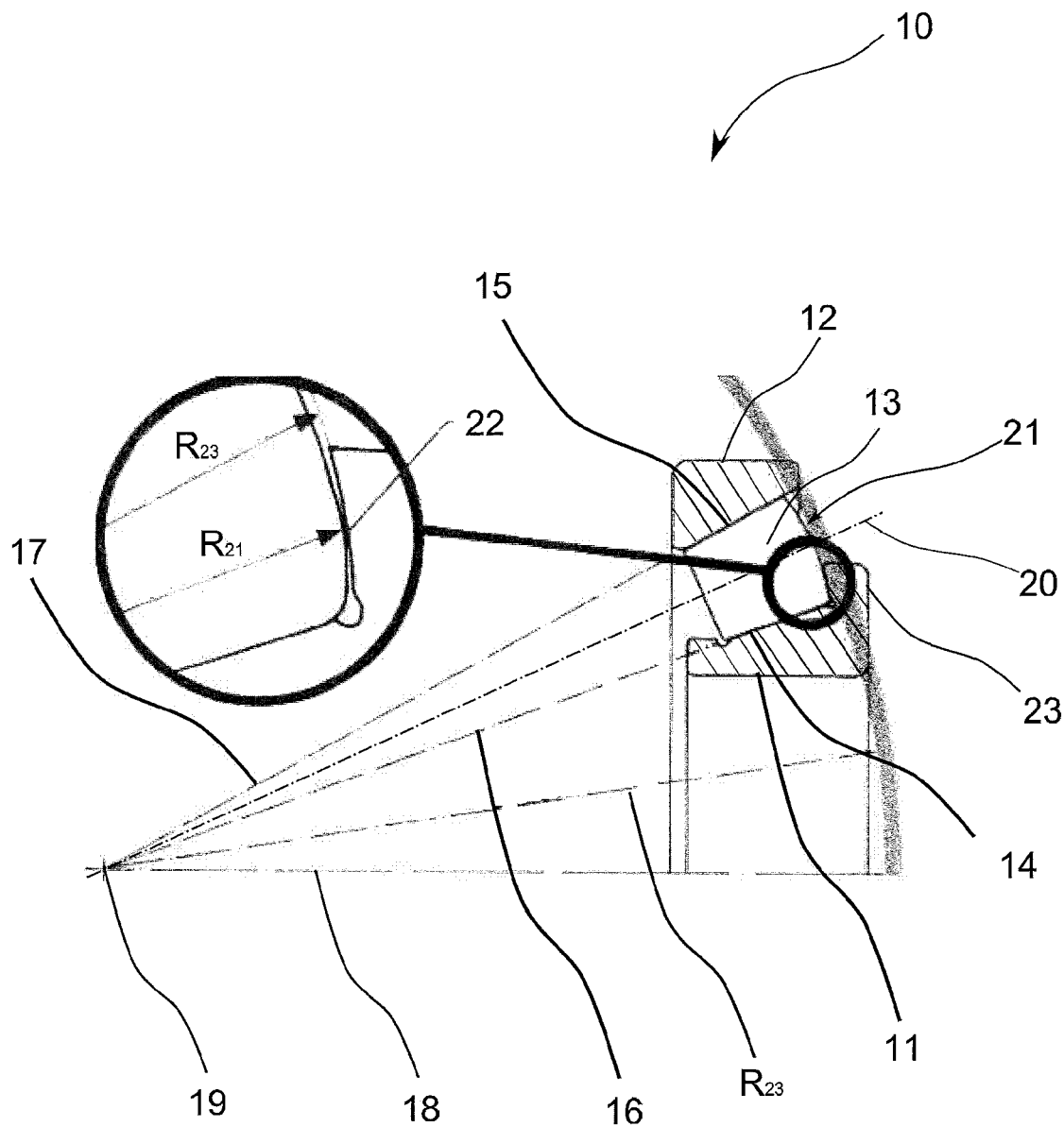
FIG. 1 shows a schematic longitudinal section through a roller bearing having spherical flanges.
Figure 2:
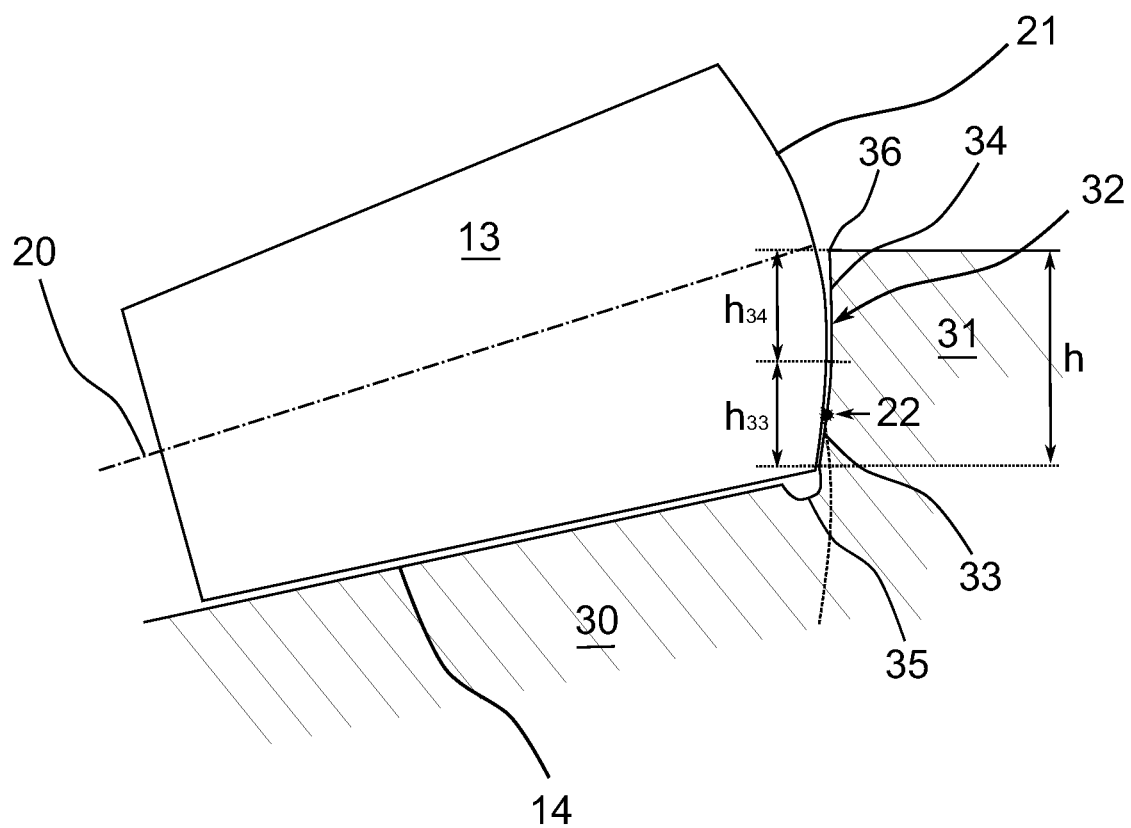
FIG. 2 shows a schematic longitudinal section through a roller bearing having a flange surface with a spherical flange surface section and an opening flange surface section according to an exemplary embodiment of the present invention.

FIG. 2 shows, in a schematic longitudinal section, a section of a roller bearing according to an exemplary embodiment of the present invention.

A part of a bearing ring 30 is depicted for the roller bearing having a raceway 14 for at least one roller 13. The roller 13 has a curved roller end surface 21 having a first curvature, which curved roller end surface 21 can be formed e.g. partially spherical. The bearing ring 30 has a flange 31 for transferring axial forces, which flange 31 is disposed end-side to or on the end side of the roller 13 having a flange surface 32 facing towards the roller end surface.

Figure 3:
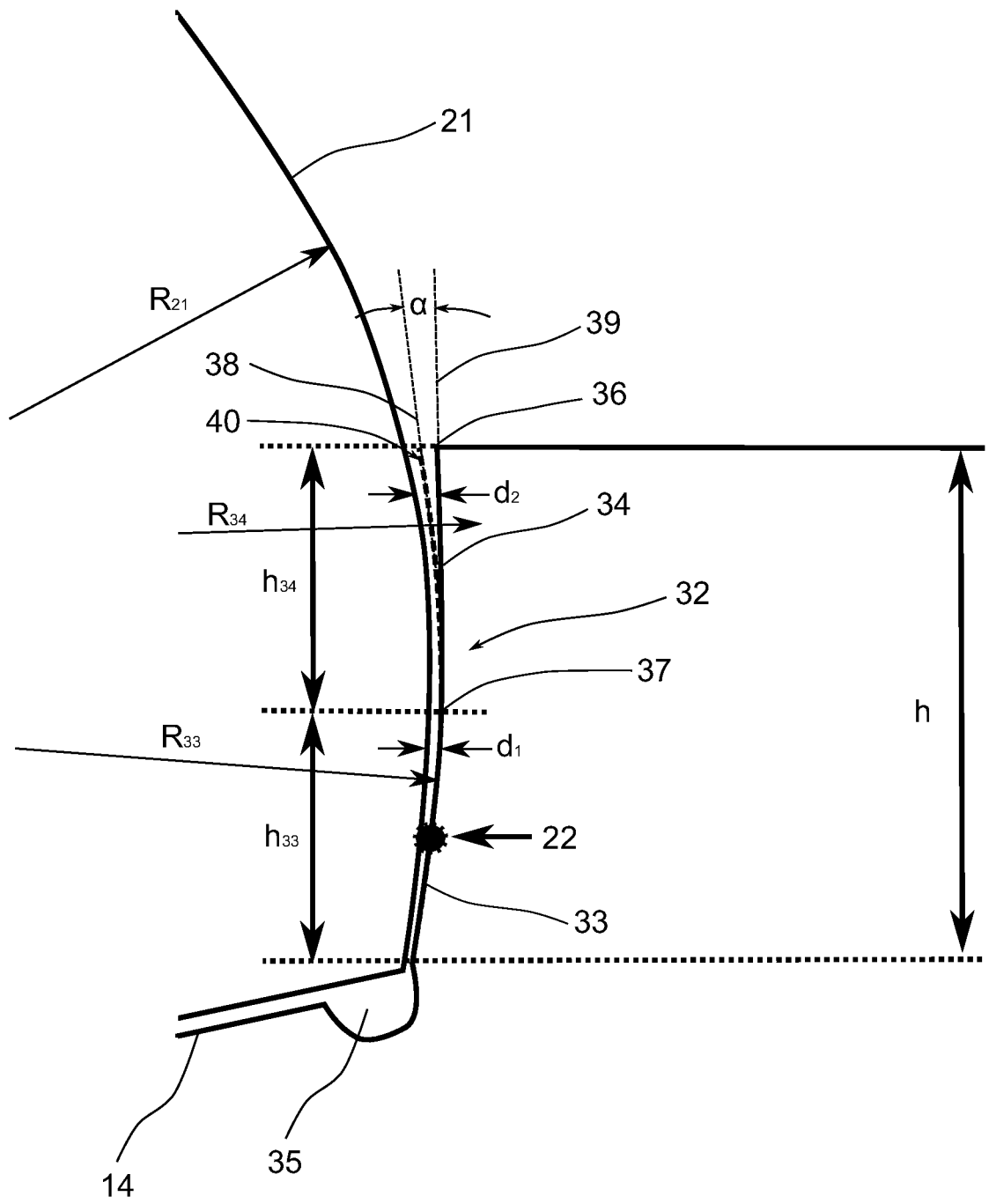
FIG. 3 shows an enlarged representation of the roller-flange contact region according to FIG. 2.

As depicted in the enlarged view of FIG. 3 in addition to FIG. 2, the flange surface 32 facing towards the roller end surface 21 comprises a spherical flange surface section 33 having a second curvature, wherein the first and the second curvature are chosen so as to achieve a first gap dimension $d_1$, having a maximum $d_{1,max}$, between the spherically formed roller end surface 21 and the spherical flange surface section 33. The flange surface 32 also has an opening flange surface section 34 having a lesser curvature than the second curvature, so that a greater gap dimension $d_2$ than the (maximum) first gap dimension $d_{1,max}$ is achieved between the roller end surface 21 and the opening flange surface section 34. According to exemplary embodiments, the second curvature of the spherical flange surface section 33 can be designed as constant or variable.

In this case curvature shall be understood to mean a change of direction per unit length. The curvature e.g. of a straight line is everywhere equal to zero, since its direction does not change. A circle having a radius r has the same curvature everywhere (namely 1/r), since its direction changes everywhere equally strongly. With all other curves the curvature changes from curve point to curve point. The curvature of a curve at a point thus indicates how strongly the curve deviates, in the immediate vicinity of the point, from a straight line. In a curved surface, such as for example the flange surface 32, one notices its curvature for example in a quadratically increasing deviation of the surface from its tangential plane. A stronger curvature makes itself noticeable as a stronger deviation from the plane. For the present case this also means, for example, that the spherical flange surface section 33 deviates more strongly per path length from a tangential plane to the opening flange surface section 34 of the flange surface 32 than regions of the opening flange surface section 34 itself.

The spherical roller end surface 21 is described by a first radius $R_{21}$, which can have its origin substantially on the axis of rotation 20 of the roller 13. The spherical flange surface section 33 is described by a second radius $R_{33}$, which is larger than the first radius $R_{21}$ (i.e. $R_{21} < R_{33}$) and which can have its origin substantially on the axis of rotation 18 of the roller bearing 10. The radii $R_{21}$ and $R_{33}$ or the surfaces 21 and 33 described thereby can indeed be in principle disposed concentric, i.e. with an identical origin on the roller rotational axis 20. In order to at least theoretically obtain a defined contact point 22 between the roller end surface 21 and the spherical flange surface section 33, the radii $R_{21}$ and $R_{33}$ or the surfaces 21 and 33 described thereby can generally speaking (as here) also be disposed non-concentric, i.e. with a non-identical origin on the roller rotational axis 20 or bearing rotational axis 18. In any case, the first $R_{21}$ and the second radius $R_{33}$ and their origins are chosen so as to achieve a first gap dimension $d_1$ between the spherically-designed roller end surface 21 and the spherical flange surface section 33, which first gap dimension $d_1$ can assume a maximum value $d_{1,max}$. However, the opening flange surface section 34 now has according to the invention, a lesser curvature than the spherical flange surface section 33, so that between the opening flange surface section 34 and the spherical roller end surface 21a second gap dimension $d_2$ arises, which, starting from the maximum value $d_{1,max}$ out to a radial end of the opening flange surface section 34 or out to one of the flange edges 36 facing away from the raceway 14 increases up to a maximum value $d_{2,max}$, i.e. $d_{1,max} \le d_2 \le d_{2,max}$.

In the exemplary embodiment illustrated in FIGS. 2 and 3, the spherical flange surface section 33 extends from a corner region 35 between the raceway 14 and the flange surface 32 towards the flange edge 36 facing away from the raceway 14. In a bearing inner ring the spherical flange surface section 33 can thus for example lie in a lower region of the flange 31 adjacent to a flange or groove edge 35, which lower region faces towards an inner race 14, wherein the opening flange section 34 lies in this case in the upper region of the flange 31. In one exemplary embodiment for a bearing outer ring it would be correspondingly reversed, i.e. the spherical flange surface section 33 would here lie in an upper-in-a-radial-direction region of the flange adjacent to a flange or groove edge, wherein the opening flange section then would lay in the lower region of the guiding flange, which lower region faces away from an outer race. Of course the spherical flange surface section would also lay here adjacent to the race.

As is shown in FIG. 3, the spherical flange surface section 33 and the opening flange surface section 34 directly border each other in a boundary region 37. That is, in the boundary region 37, for example a boundary line, the spherical flange surface section 33 and the opening flange surface section 34 merge directly into each other. The flange outer surface 32 preferably extends continuously in the boundary region 37, i.e. without corners, creases, or edges, so that it is possible to place a tangential plane to the flange surface 32 through a boundary point in the boundary region 37.

According to exemplary embodiments, the opening flange surface section 34 makes possible an opening of the flange 31 or of the flange surface 32 relative the spherical flange surface section 33 in an angular range α from greater than 0° to 30°, preferably in a range $0° \ 0' \ 6'' \le \alpha \le 30°$. The opening angle α of the opening flange surface 34 relative to the spherical flange surface section 33 can be obtained, for example, by determining the largest angle between a tangential plane 38 to the spherical flange surface section that is hypothetically extended into the opening flange surface section and a tangential plane 39 to the opening flange surface segment 34. For this, the largest angle between a group of tangential planes 38 to the spherical flange surface section that is hypothetically extended into the opening flange surface section, and a group of tangential planes 39 to the opening flange surface section 34 can be determined. The spherical flange surface section that is hypothetically extended into the opening flange surface section is indicated in FIG. 3 by reference number 40. The (largest) angle α thus results from a tilting of the tangential plane 39 to the opening flange surface section 34 towards the tangential plane 38 to the imaginary spherical flange surface section which extends into the opening flange surface section of a completely spherically-designed flange having radius $R_{33}$. In this respect, each of the tangential planes to the radially-outer-lying flange ends of the opening flange surface section 34 and of the corresponding flange ends of the imaginary and spherical flange surface section, which extends into the opening flange surface section, are meant.

According to exemplary embodiments of the present invention, the spherical flange surface section 33 extends over a flange surface section corresponding to at least one third of a flange height h of the flange 31. That is, a height $h_{33}$ of the spherical flange surface section 33 corresponds to at least one third of the entire flange height h, i.e. $h_{33} \geq \frac{1}{3}h$. Accordingly, a height $h_{34}$ of the opening flange surface section 34 directly adjacent thereto is at most two thirds of the total flange height h, i.e. $h_{34} \leq \frac{2}{3}h$. Preferably a height $h_{33}$ of the spherical flange surface section 33 falls within a range of $\frac{1}{3}h \leq h_{33} \leq \frac{3}{4}h$ and accordingly the height $h_{34}$ of the opening flange surface section 34 falls within a range $\frac{1}{4}h \leq h_{34} \leq \frac{2}{3}h$.

There are different possibilities for the embodiment of the opening flange region 34. Although FIGS. 2 and 3 illustrate an exemplary embodiment, wherein the opening flange surface section 34 is formed by a further spherical, but less strongly curved flange surface section 34 connecting radially to a spherical flange surface section 33, and which thus is defined by a radius $R_{34}$ larger than the second radius $R_{33}$, other exemplary embodiments of the present invention can also be provided, which are formed by a straight or flat flange surface section connecting tangentially to the spherical flange surface section 33. This flat flange surface section then virtually has an infinite radius $R_{34}$, which is consequently also larger than the radius $R_{33}$ describing the spherical flange surface section 33. Further, the radius $R_{34}$ of the opening region 34—starting from $R_{33}$—can also continuously increase within the opening flange surface section 34 from inside to outside.

After exemplary embodiments have been described with reference to FIGS. 2 and 3, wherein the spherical section 33 is disposed in the lower region of the flange 31 (adjacent to the flange edge/groove edge 35) and the opening flange section 33 is disposed in the upper region of the flange 31, other exemplary embodiments are subsequently described with reference to FIGS. 4 and 5, wherein the spherically-designed section 33 does not border the flange edge 35, so that an opening flange region 34 is respectively located above and below the spherical section 33.

Figure 4:
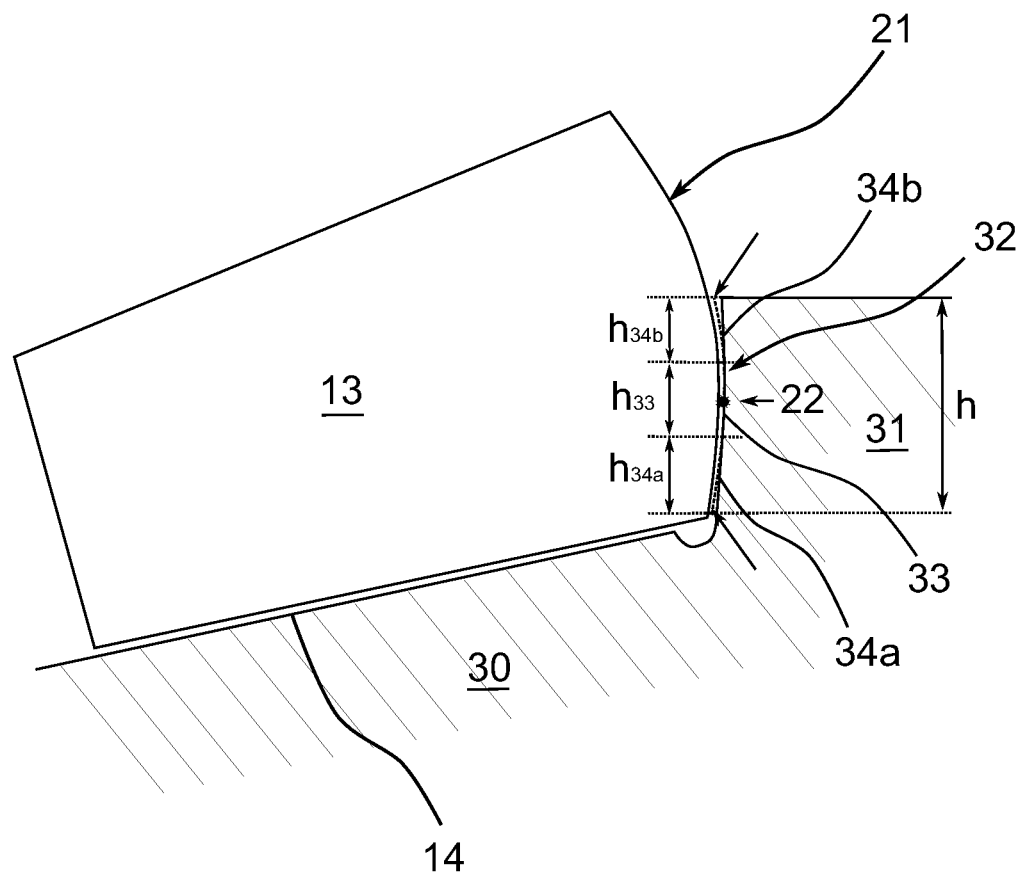
FIG. 4 shows a schematic longitudinal section through a roller bearing having a flange surface with a spherical flange surface section and an opening flange surface section according to a further exemplary embodiment of the present invention.
Figure 5:
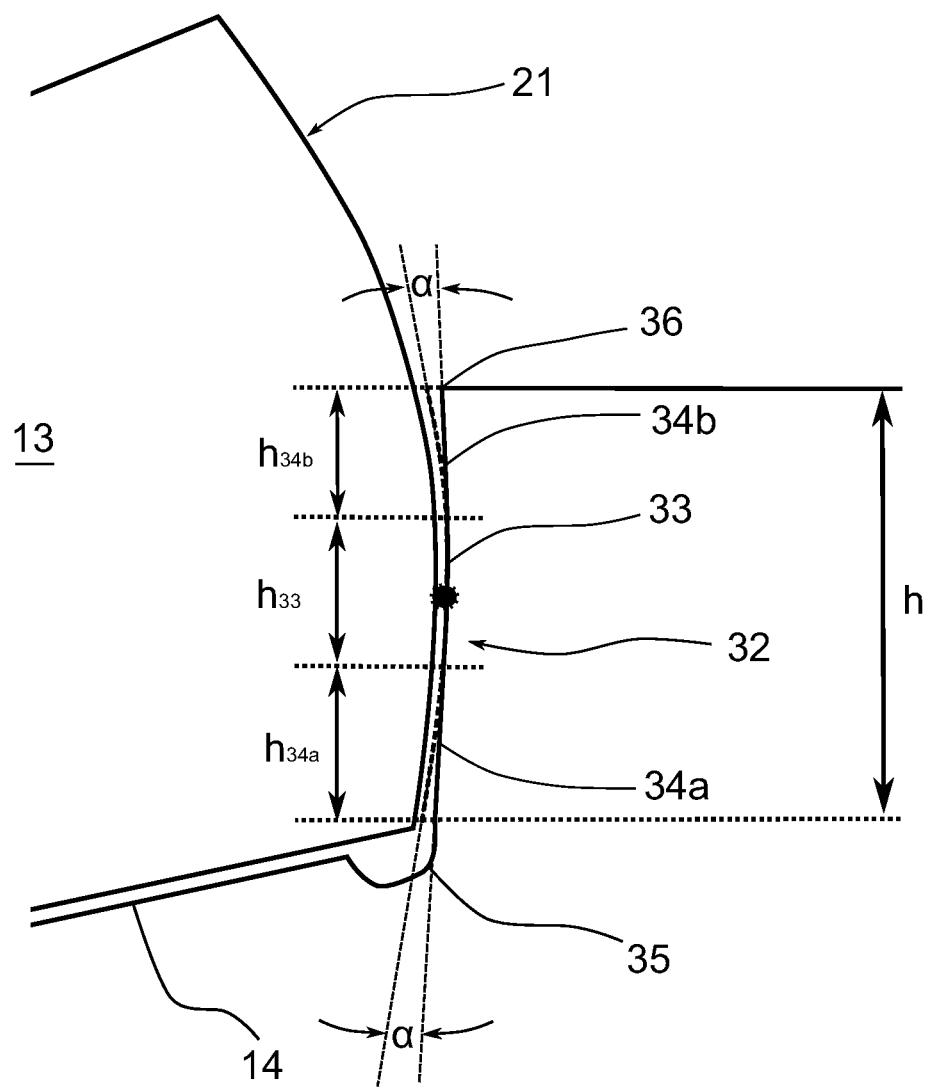
FIG. 5 shows an enlarged representation of the roller-flange contact region according to FIG. 4.

According to the exemplary embodiment illustrated in FIGS. 4 and 5, a first opening flange surface section 34a extends from a corner region 35 between the raceway 14 and the flange surface 32. Directly bordering thereto, the spherical flange surface section 33 connects in the radial direction to the first opening flange surface section 34a. A second opening flange surface section 34b connects directly in the radial direction to an end of the spherical flange surface section 33, which end is facing away from the first opening flange surface section 34a; the second opening flange surface section 34b extends out to the radial end or the edge 36 of the flange 31.

According to FIGS. 4 and 5, the spherical flange surface section 33 is thus embedded between two opening flange surface sections 34a, b, which border different ends of the spherical flange surface section 33. The height $h_{33}$ of the spherical flange surface section 33 here also corresponds to at least one third of the total flange height h, i.e. $h_{33} \geq \frac{1}{3}h$. In exemplary embodiments the height $h_{33}$ of the spherical flange surface section 33 preferably falls within a range $\frac{1}{3}h \geq h_{33} > \frac{1}{2}h$. Accordingly, the sum of the heights $h_{34a}$, $h_{34b}$ of the opening flange surface section 34a, b directly bordering thereon is at most two thirds of the total flange height, i.e. $(h_{34a}+h_{34b}) \leq \frac{2}{3}h$. Preferably, the heights, $h_{34a}$, $h_{34b}$ of the opening flange surface sections 34a, 34b each do not fall below $\frac{1}{6}h$. The flange sections 34a, 34b can also have different heights $h_{34a}$ and $h_{34b}$ (e.g. $h_{33}=\frac{1}{2}h$; $h_{34a}=\frac{1}{6}h$; $h_{34b}=\frac{3}{6}h$).

In all exemplary embodiments, the roller-flange contact geometry is chosen such that the contact point 22 lies in the region of the spherical flange surface section 33. The opening regions 34, which can also be formed spherical, however with lesser curvature than the spherical region 33, or can be flat or straight, respectively make possible an opening a of the flange 31 that guides the roller 13, of approximately 0° 0' 6" to 30° in comparison to a flange geometry with a completely spherically-designed flange.

Figure 6:
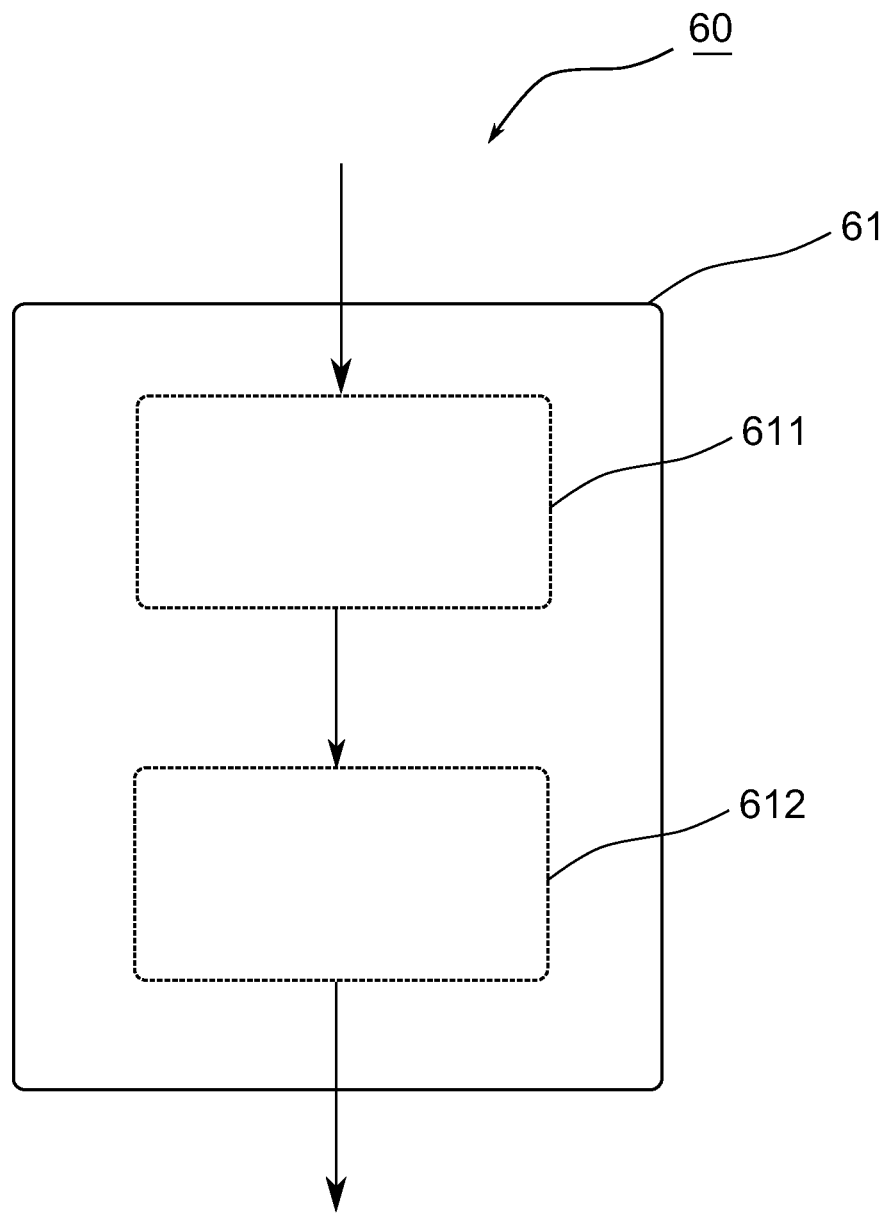
FIG. 6 shows a schematic flow diagram for a method of manufacture for a roller bearing having a flange having a spherical flange region and an opening flange region.

For the sake of completeness, a manufacturing method 60 for manufacturing a bearing ring for a roller bearing having a raceway for at least one roller 13 will now be explained with reference to FIG. 6. The roller 13 has a spherically or partially spherically formed roller end surface 21 having a first curvature.

The manufacturing process 60 includes a step 61 for preparing a flange 31 disposed on an end side of the roller for transferring axial forces, which flange 31 has a flange surface 32 facing towards the roller end surface 21.

The step 61 can in turn be subdivided in a first substep 611 for preparing/producing a spherical surface section 33 of the flange surface 32 having a second curvature, wherein the second curvature is chosen with respect to the first curvature so as to achieve a first gap dimension $d_1$ between the spherically-formed roller end surface 21 and the spherical flange surface section 33.

According to a second substep 612, an opening surface section 34 of the flange surface 32 is also provided or produced, which opening surface section 34 has a lesser-than-the-second curvature for an enlarged gap dimension $d_2$, with respect to the first gap dimension $d_1$, between the roller end surface 21 and the opening flange surface section 34. It has already been discussed in detail in the foregoing.

In summary, the proposed flange shape is thus to be sought, in order to reduce the sensitivity of the roller-flange contact point 22 to alignment errors and skewing of the bearing in use, but nevertheless to be able to ensure a sufficient guiding of the roller 13 on the raceway during operation. The inventive flange geometry has a spherical section 33, which can ensure the roller guiding as well as a low Hertzian pressure. Furthermore, the proposed flange geometry has at least one opening section 34, which produces a larger gap dimension between the roller end surface 21 and the flange surface 32 than would be provided by a purely spherical flange.

The spherical section 33 can for example be used in the lower region of the flange 31 (bordering the flange edge/groove edge), wherein in this case the opening flange section 34 lies in the upper region of the flange (see FIGS. 2 & 3). It is also possible that the spherically embodied section 33 does not border a flange edge, so that opening flange regions 34a, b are located above and below the spherical section (see FIGS. 4 & 5).

The inventive roller-flange-contact-geometry of a spherical flange in combination with an opening section has the following advantageous features:

The roller guiding during operation is preserved due to the spherical flange portion 33, Low Hertzian pressure due to the spherical flange portion 33, The opening flange sections 34 reduce the size of the contact ellipse in comparison to purely spherical flanges, whereby an overlapping of the contact ellipse with the flange edges is avoided, Due to the opening flange regions 34 there is a lower sensitivity to the location of the contact point 22 between the roller end side 21 and the flange 31 with respect to alignment errors, A defined contact point 22 between the roller 13 and the flange 31 is possible.

The proposed roller-flange geometry is designed such that in the ideal geometry, the roller end side and the flange lie in the spherical flange region. The sensitivity of the contact point to alignment errors is identical in the spherical flange section to the sensitivity of a purely spherical flange. If the contact point shifts due to alignment errors in the opening flange section, then the sensitivity is greatly reduced, which can prevent a "wandering" of the theoretical contact point out over the flange edge and thus can also prevent high edge pressures.

There are different possibilities for the embodiment of the opening flange section. For one, a straight flange region would be conceivable, which connects tangentially to the arc of the spherical flange region. The opening flange region could also be defined by a radius which is larger than the radius of the spherical region.

Although the present invention has been described with reference to an embodiment having tapered roller bearings and tapered rollers, exemplary embodiments are not limited to such designs. In principle, the present invention can also be applied to other rollers and roller bearings, such as e.g. to cylindrical and barrel roller bearings.

REFERENCE NUMBER LIST

10 Roller bearing
11 Bearing inner ring
12 Bearing outer ring
13 Roller
14 Inner roller raceway
15 Outer roller raceway
16 Inner straight line
17 Outer straight line
18 Bearing axis of rotation
19 Pivot point
20 Roller axis
21 Roller end side
22 Contact point
23 Spherical flange
24 Flange surface radius
30 Part of a bearing ring
31 Partially spherical, partially open flange
32 Flange surface
33 Spherical flange surface section
34 Opening flange surface section
35 Corner region between raceway and flange surface
36 Flange edge facing away from the raceway
37 Boundary between spherical and opening flange surface section
38 Tangential plane to spherical flange surface section hypothetically extended into opening flange surface section
39 Tangential plane to opening flange surface section
40 Flange surface geometry having purely spherical flange
60 Method of manufacture
61 Step for providing a flange, disposed on an end-side of the roller, for transferring axial forces, which flange has a flange surface facing towards the roller end surface
611 Substep for providing a spherical surface section
612 Substep for providing an opening surface section

The invention claimed is:

1. A bearing ring for a roller bearing having a raceway for at least one roller that includes an at least partially spherically formed roller end surface having a first curvature, the bearing ring comprising:
a flange disposed on an end-side of the roller for transferring axial forces, the flange having a flange surface facing towards the roller end surface, a spherical flange surface section having a second curvature being defined on the flange surface,
wherein the first and the second curvature differ such that a first gap dimension ($d_1$) exists between the spherically formed roller end surface and the spherical flange surface section, and
the flange surface also has an opening flange surface section having a third curvature, which is less than the second curvature, such that a second gap dimension ($d_2$) exists between the roller end side and the opening flange surface section, the second gap dimension ($d_2$) being larger than the first gap dimension ($d_1$).

2. The bearing ring according to claim 1, wherein an angle ($\alpha$) is defined between a first plane, which is tangential to an imaginary portion of the spherical flange surface section that is extended towards the opening flange surface section, and a second plane, which is tangential to the opening flange surface section, and the angle ($\alpha$) falls within a range from greater than 0° to 30°.

3. The bearing ring according to claim 1, wherein the spherical flange surface section has a height ($h_{33}$) that is at least one third of a total flange height (h) of the flange in a radial direction.

4. The bearing ring according to claim 1, wherein the spherical flange surface section extends from a corner region between the raceway and the flange surface.

5. The bearing ring according to claim 1, wherein:
a first opening flange surface section extends from a corner region between the raceway and the flange surface,
the spherical flange surface section connects to the first opening flange surface section in the radial direction, and
on a region of the spherical flange surface section facing away from the first opening flange surface section, a second opening flange surface section of the spherical flange surface section extends out to a radial end of the flange.

6. The bearing ring according to claim 1, wherein the opening flange surface section is formed by a flat flange surface section connecting tangentially to the spherical flange surface section.

7. The bearing ring according to claim 1, wherein the opening flange surface section is formed by a further spherical flange surface section connecting to the spherical flange surface section, which further spherical flange surface section has a lesser curvature than the second curvature of the spherical flange surface section.

8. The bearing ring according to claim 1, wherein the roller bearing is a tapered roller bearing and the roller is a tapered roller.

9. The bearing ring according to claim 1, wherein the bearing ring is a bearing inner ring.

10. A roller bearing comprising:
at least one roller having an at least partially spherical roller end surface with a first curvature, and
a bearing ring having:
   a raceway rollably supporting the at least one roller, and
   a flange extending from an axial end of the raceway and including a flange surface that contacts the roller end surface, the flange surface comprising a spherical flange surface section with a second curvature and a first opening flange surface section with a third curvature that is less than second curvature,
wherein the first curvature differs from the second curvature such that a first gap ($d_1$) exists between the at least partially spherical roller end surface and the spherical flange surface section, and
a second gap ($d_2$) exists between at least partially spherical roller end side and the first opening flange surface section, the second gap ($d_2$) being larger than the first gap ($d_1$).

11. The roller bearing according to claim 10, wherein the spherical flange surface section directly borders the first opening flange surface section.

12. The roller bearing according to claim 11, wherein:
an angle ($\alpha$) is defined between a first plane, which is tangential to an imaginary portion of the spherical flange surface section that extends towards the opening flange surface section, and a second plane, which is tangential to the opening flange surface section, and $0° < \alpha \leq 30°$.

13. The roller bearing according to claim 12, wherein the spherical flange surface section has a height ($h_{33}$) in a radial direction of the roller bearing that is at least one third of a total flange height (h) of the flange in the radial direction.

14. The roller bearing according to claim 13, wherein the spherical flange surface section directly borders a corner connecting the raceway and the flange.

15. The roller bearing according to claim 13, wherein:
the first opening flange surface section directly borders a corner connecting the raceway and the flange,
the spherical flange surface section directly borders the first opening flange surface section in the radial direction, and a second opening flange surface section is defined on the flange surface, directly borders the spherical flange surface section in the radial direction and extends to a radially outermost end of the flange.

16. The roller bearing according to claim 15, wherein the second opening flange surface section is formed by a flat flange surface section connecting tangentially to the spherical flange surface section.

17. The roller bearing according to claim 15, wherein the second opening flange surface section is formed by a further spherical flange surface section directly bordering the spherical flange surface section, the further spherical flange surface section having a lesser curvature than the second curvature of the spherical flange surface section.

18. The roller bearing according to claim 13, wherein the roller bearing is a tapered roller bearing and the roller is a tapered roller.

19. The roller bearing according to claim 18, wherein the bearing ring is a bearing inner ring.

20. A method for manufacturing a bearing ring having a raceway for at least one roller, the roller having an at least partially spherical roller end surface with a first curvature, the method comprising:
providing a flange on an end of the raceway for transferring axial forces, such that the flange includes a flange surface configured to face towards the roller end surface,
wherein said flange providing step further comprises:
providing a spherical flange section with a second curvature on the flange surface, the second curvature differing from the first curvature such that a first gap dimension ($d_1$) exists between the spherically formed roller end surface and the spherical flange surface section, and
providing an opening surface section having a third curvature on the flange surface such that the third curvature is less than the second curvature and a second gap dimension ($d_2$) exists between the roller end surface and the opening flange surface section, the second gap dimension ($d_2$) being larger than the first gap dimension ($d_1$).

* * * * *